US010191639B2

(12) United States Patent
Bains et al.

(10) Patent No.: US 10,191,639 B2
(45) Date of Patent: Jan. 29, 2019

(54) ATTRIBUTE IDENTIFIER AND ANALYZER TOOL

(71) Applicant: Robert Bosch GmbH, Stuttgart (DE)

(72) Inventors: Baljit Bains, Canton, MI (US); Pendyala Naga Venkata Krishna Rao, Andhra Pradesh (IN); Surendran Devaraj, Tamil Nadu (IN)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 15/029,812

(22) PCT Filed: May 7, 2014

(86) PCT No.: PCT/US2014/037177
§ 371 (c)(1),
(2) Date: Apr. 15, 2016

(87) PCT Pub. No.: WO2015/060898
PCT Pub. Date: Apr. 30, 2015

(65) Prior Publication Data
US 2016/0253081 A1    Sep. 1, 2016

(30) Foreign Application Priority Data

Oct. 25, 2013   (IN) .......................... 1216/KOL/2013

(51) Int. Cl.
*G06F 3/048*   (2013.01)
*G06F 3/0484*  (2013.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
CPC ............... G06F 3/04847; G06F 3/0482; G06F 3/04842; G06F 17/50; G06Q 10/10
(Continued)

(56) References Cited

U.S. PATENT DOCUMENTS 5,581,796 A * 12/1996 Koga ...................... G06T 15/10
345/623
5,720,022 A   2/1998 Reichert et al.
(Continued)

FOREIGN PATENT DOCUMENTS

EP    1049033    11/2000
EP    1271414    10/2003
(Continued)

OTHER PUBLICATIONS

BCT Technology AG, "BCT Inpector Integration of Quality Management" (https://www.bct-technology.com/en/portfolio/bct-products/bct-inspector.html) dated 2015 (6 pages).
(Continued)

*Primary Examiner* — David Phantana-angkool
(74) *Attorney, Agent, or Firm* — Michael Best & Frieddrich LLP

(57) ABSTRACT

Methods and systems for identifying attributes included in a drawing. One method includes automatically, with a processing unit, identifying a plurality of attributes associated with a drawing and automatically, with the processing unit, assigning a unique identifier to each of the plurality of attributes. The method also includes automatically, with the processing unit, creating a symbol representing the assigned unique identifier for each of the plurality of attributes and displaying the symbol for each of the plurality of attributes on the drawing.

20 Claims, 20 Drawing Sheets

(51) Int. Cl.
*G06F 17/50* (2006.01)
*G06Q 10/10* (2012.01)
*G06F 3/0482* (2013.01)
*G06T 11/00* (2006.01)
*G06T 19/00* (2011.01)

(52) U.S. Cl.
CPC ............. *G06F 17/50* (2013.01); *G06Q 10/10* (2013.01); *G06T 11/00* (2013.01); *G06T 19/00* (2013.01); *G06F 2217/74* (2013.01); *G06T 2219/004* (2013.01); *G06T 2219/012* (2013.01)

(58) Field of Classification Search
USPC ......................................................... 715/771
See application file for complete search history.

(56) References Cited

U.S. PATENT DOCUMENTS

| | | | | |
|---|---|---|---|---|
| 7,225,396 | B2 | 5/2007 | Chen et al. | |
| 7,360,156 | B1* | 4/2008 | Braun ................... | G06F 9/451 715/255 |
| 7,849,408 | B1* | 12/2010 | Messinger ............. | H04L 41/22 715/733 |
| 8,024,159 | B2* | 9/2011 | Sims, Jr. ................ | G06F 17/50 382/113 |
| 8,065,116 | B2* | 11/2011 | Sims, Jr. ................ | G06F 17/50 700/103 |
| 8,095,341 | B2* | 1/2012 | Sims, Jr. ................ | G06F 17/50 700/103 |
| 8,484,556 | B2* | 7/2013 | McMillan .............. | G06T 17/00 715/209 |
| 9,367,063 | B2* | 6/2016 | Herrman ............ | G06Q 30/0635 |
| 9,441,936 | B2* | 9/2016 | Pinkston ................ | G01B 21/00 |
| 2002/0118229 | A1 | 8/2002 | Batori et al. | |
| 2002/0198611 | A1 | 12/2002 | Stejskal | |
| 2010/0087940 | A1* | 4/2010 | Sims, Jr. ................ | G06F 17/50 700/98 |
| 2013/0054189 | A1 | 2/2013 | Chang et al. | |
| 2013/0197842 | A1 | 8/2013 | Ugorji | |
| 2018/0095653 | A1* | 4/2018 | Hasek ................... | G06F 3/041 |

FOREIGN PATENT DOCUMENTS

| | | |
|---|---|---|
| EP | 1918882 | 5/2008 |
| JP | 2009295098 | 12/2009 |

OTHER PUBLICATIONS

International Search Report and Written Opinion for Application No. PCT/US2014/037177 dated Sep. 22, 2014 (12 pages).

Wikipedia: "Product and manufacturing information" Mar. 23, 2013, Retrieved from the Internet: URL:http://en.wikipedia.org/w/index.php?title=Product_and_manufacturing_information&oldid=546527836 [retrieved on Sep. 9, 2014].

Wikipedia: "JT (visualization format)" Sep. 16, 2813 Retrieved from the Internet: URL:http://en.wikipedia.org/w/index.php?title=JT_%28visualization_format%29&oldid=573125450 [retrieved on Sep. 9, 2014].

Wikipedia: "Geometric dimensioning and tolerancing", Oct. 22, 2013 Retrieved from the Internet: URL:http://en.wikipedia.org/w/index.php?title=Geometric_dimensioning_and_tolerancing&oldid=578236151 [retrieved on Sep. 9, 2014].

Wikipedia: "List of STEP (ISO 10383) parts", Apr. 21, 2013 Retrieved from the Internet: URL:http://en.wikipedia.org/w/index.php?title=List_of_STEP_%28ISO_10383%29_parts&oldid=55140B281 [retrieved on Sep. 9, 2014].

"Using GD&T Tools in AutoCAD" In: "Geometric Dimensioning and Tolerancing, 8th Edition," Feb. 15, 2010 Goodheart-Willcox Publisher, pp. 437-450.

Wikipedia: "Computer-aided design", Internet Article, Oct. 24, 2013 (Oct. 24, 2013), XP055452674, Retrieved from the Internet: URL:https://en.wikipedia.org/w/index.php?title=Computer-aided_design&oldid=578547943 [retrieved on Feb. 21, 2018].

Wikipedia: "AutoCAD", Internet Article, Oct. 23, 2013 (Oct. 23, 2013), XP055452676, Retrieved from the Internet: URL:https://en.wikipedia.org/w/index.php?title=AutoCAD&oldid=578469557 [retrieved on Feb. 21, 2018].

Wikipedia: "Identifier", Internet Article, Sep. 5, 2013 (Sep. 5, 2013), XP055452678, Retrieved from the Internet: EPO Form 2906 01.91TRI URL:https://en.wikipedia.org/w/index.php?title=Identifier&oldid=571626664 [retrieved on Feb. 21, 2018].

Wikipedia: "Version control", Internet Article, Jul. 6, 2013 (Jul. 6, 2013), XP055452748, Retrieved from the Internet: URL:https://en.wikipedia.org/w/index.php?title=Version_control&oldid=563111975 [retrieved on Feb. 21, 2018].

Office Action from the European Patent Office for Application No. 14736063.0 dated Mar. 1, 2018 (10 pages).

* cited by examiner

FIG. 8 ItemId Warning! Do you want to select view order? Yes / No

FIG. 9 Message: Item ID is already placed for this entity. Please select different entity. Ok

FIG. 10 Enter Attribute value. '0' by default will take last number. Enter Value. Ok / Back / Cancel

FIG. 11 Message: Attribute value already present. Please enter different value. Ok

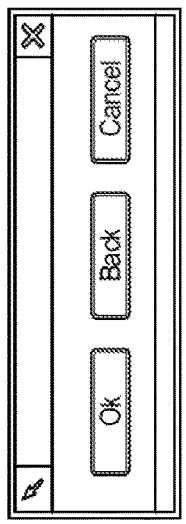
FIG. 21
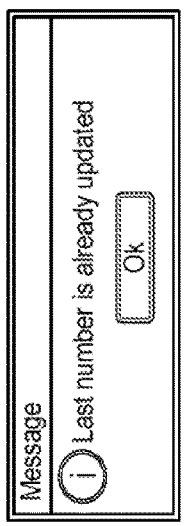
FIG. 20
| DIMENSION | ROOT DIM | TOP DIM |
|---|---|---|
| X | 48 | 48.1 |
| Y | 10.2 | 10.3 |
| Z | 11.6 | 11.7 |
FIG. 22a
| DIMENSION | ROOT DIM | TOP DIM |
|---|---|---|
| X | 169 | 172 |
| Y | 170 | 173 |
| Z | 171 | 174 |
FIG. 22b

FIG. 24

| PART NO | 6002KS0708 |
|---|---|
| PART DESCRIPTION | SUCTION |
| REVISION LEVEL | 2 |

| DIMENSION ID | DIMENSION DESC | DIMENSION | TOLERANCE | POS TOL | NEG TOL | DRAWING SHEET | DRAWING ZONE |
|---|---|---|---|---|---|---|---|
| 1 | REFERENCE | 20.6 | 0 | 0 | 0 | SHT1 | A2 |
| 2 | REFERENCE | 21.36 | 0 | 0 | 0 | SHT1 | B4 |
| 3 | NOMINAL | 20.6 | 0 | 0 | 0 | SHT1 | A16 |
| 4 | NOMINAL | 16.9 | 0.1 | 0.05 | -0.06 | SHT1 | A16 |
| 5 | NOMINAL | 31 | 0 | 0 | 0 | SHT1 | A16 |
| 6 | NOMINAL | 6 | 0 | 0 | 0 | SHT1 | C16 |
| 7 | NOMINAL | 13.38 | 0.3 | 0.3 | 0 | SHT1 | D20 |
| 8 | NOMINAL | 0.4 | 0.3 | 0.16 | -0.16 | SHT1 | D14 |
| 9 | NOMINAL | 12.4 | 0 | 0 | 0 | SHT1 | D12 |
| 10 | NOMINAL | 1.7 | 0 | 0 | 0 | SHT1 | D10 |
| 11 | NOMINAL | 0.7 | 0 | 0 | 0 | SHT1 | D10 |
| 12 | NOMINAL | 2.6 | 0 | 0 | 0 | SHT1 | D10 |
| 13 | NOMINAL | 0.8 | 0.3 | 0.16 | -0.16 | SHT1 | E17 |
| 14 | NOMINAL | 16.7 | 0.2 | 0.1 | -0.1 | SHT1 | E16 |
| 15 | CONCENTRICITY | 20.6 | 0.2 | 0.1 | -0.1 | SHT1 | F17 |
| 16 | REFERENCE | 0 | 0.1 | 0 | 0 | SHT1 | F17 |
| 17 | CONCENTRICITY | 21.36 | 0.1 | 0.05 | -0.05 | SHT1 | G17 |
| 18 | NOMINAL | 0 | 0.1 | 0 | 0 | SHT1 | G10 |
| 19 | NOMINAL | 38.73 | 0 | 0 | 0 | SHT1 | G15 |
| 20 | NOMINAL | 16.03 | 0.25 | 0.13 | -0.13 | SHT1 | A7 |
| 21 | NOMINAL | 0.4 | 0 | 0 | 0 | SHT1 | A12 |
| 21.01 | NOMINAL | 0.4 | 0.1 | 0 | 0 | SHT1 | A12 |
| 21.02 | NOMINAL | 0.4 | 0 | 0 | 0 | SHT1 | A12 |
| 22 | NOMINAL | 0 | 0 | 0 | 0 | SHT1 | A12 |
| 22.28 | NOMINAL | 0 | 0 | 0 | 0 | SHT1 | A12 |
| 23 | NOMINAL | 20 | 0 | 0 | 0 | SHT1 | A8 |
| 23.01 | NOMINAL | 20 | 0 | 0 | 0 | SHT1 | A8 |
| 23.02 | NOMINAL | 20 | 0 | 0 | 0 | SHT1 | A8 |
| 24 | NOMINAL | 1.2 | 0 | 0 | 0 | SHT1 | B11 |
| 25 | NOMINAL | 0.76 | 0.3 | 0.16 | -0.16 | SHT1 | B11 |
| 26 | NOMINAL | 0.76 | 0.25 | 0.13 | -0.13 | SHT1 | B7 |
| 27 | NOMINAL | 10.3 | 0.2 | 0.1 | -0.1 | SHT1 | B11 |
| 28 | NOMINAL | 11.73 | 0.25 | 0.13 | -0.13 | SHT1 | B12 |
| 29 | NOMINAL | 2.8 | 0.25 | 0.13 | -0.13 | SHT1 | C6 |
| 30 | NOMINAL | 12.2 | 0 | 0 | 0 | SHT1 | C7 |
| 31 | NOMINAL | 12.8 | 0 | 0 | 0 | SHT1 | C12 |

*FIG. 27*

ATTRIBUTE IDENTIFIER AND ANALYZER TOOL

RELATED APPLICATIONS

The current application claims priority to Indian Provisional Application No. 1216/KOL/2013, filed Oct. 25, 2013, the entire content of which is hereby incorporated by reference.

BACKGROUND

Technical or engineering drawings have many attributes that define the details of the design. These attributes can consist of dimensions, tolerances, geometric dimensioning and tolerancing ("GDT") callouts, drawing attribute symbols, design and manufacturing specifications, notes, etc. These attributes are displayed on the drawing next to the associated drawing features. The drawings can be stored and handled in electronic form with these attached attributes. When stored electronically, the drawing's attributes may be modified or deleted during edits of the drawing. As drawings are transferred between engineers and departments, the attributes can be labeled inconsistently. Engineers can also make modifications to the drawings, both purposefully and accidently. In both cases, the modifications can contradict original design intent. Therefore, to prevent errors from entering the manufacturing process, the drawings must be checked for improper changes to the drawing's attributes.

SUMMARY

Attribute identifiers can be used to number and record drawing attributes. When attributes are numbered, detection of missing or deleted attributes is easier. Attribute identifiers can also create a snapshot of a drawing's attributes for each revision. For example, a drawing's attributes can be compared with earlier versions of the drawing using the snapshots created by the attribute numbering to ensure attribute accuracy throughout the design process.

Traditionally, adding and comparing attribute identifiers was a manual task, which required considerable time and expense. Additionally, manual entry and comparison of attribute identifiers can introduce errors that carry throughout the design process. Correcting these errors requires additional effort and expense.

Therefore, embodiments of the invention provide systems and methods for automatically identification of drawing attributes. These systems and methods reduce the costs and inefficiencies of manually entering attribute identifiers. One system includes a processor configured to scan a drawing for attributes, a memory (such as a non-transitory machine readable medium) configured to record attribute numbers and values, and input/output components to receive commands and display results. The system provides, among other things, greater efficiency and automatic identification of all of substantially all attributes associated with a drawing, which results in better quality when compared to manual systems.

In some embodiments, the processor is configured to automatically scan a drawing and detect all the attributes. The tool automatically assigns each attribute a unique identification number. The attribute identifier and the value of the associated attribute are recorded in the memory (e.g., along with the associated drawing). The tool can receive user input to control the detection and display of attribute numbers. The tool can also create a table that lists the last attribute number that was assigned and any attribute numbers that were deleted. The tool can also generate and output a report that summarizes information about each identified attribute.

For example, in one embodiment, the tool generates an attribute report and outputs the report at a user's request (e.g., to a display and/or to a printer). The report tabulates each attribute number with the values of the dimension description, the tolerance, and the location of the attribute on the drawing. The report also contains a date and a document revision number, which allow comparisons with other reports to analyze attribute changes and perform a drawing quality check. For example, a dimension or tolerance change can trigger a stack-up analysis verification to ensure design intent integrity.

In another embodiment, the tool allows a user to manually direct the scanning and identification function. For example, the user can instruct the tool to automatically assign all attribute numbers or to assign attribute numbers manually. When attribute numbers are assigned manually, the user can select which attributes to include in the attribute numbering. When a user selects an attribute for numbering, the tool selects the next available number or a number selected by the user (e.g., if the selected number has not already been assigned to an attribute). Additionally, a user can delete or reassign attribute numbers. The results of manual or automatic numbering can be displayed in an attribute identifier table, which can be displayed on the face of a drawing.

For example, one embodiment of the invention provides a system for identifying attributes included in a drawing. The system includes a processing unit. The processing unit is configured to automatically identify a plurality of attributes associated with a drawing and automatically assign a unique identifier to each of the plurality of attributes. The processing unit is also configured to automatically create a symbol representing the assigned unique identifier for each of the plurality of attributes and display the symbol for each of the plurality of attributes on the drawing.

Another embodiment of the invention provides a method of identifying attributes included in a drawing. The method includes automatically, with a processing unit, identifying a plurality of attributes associated with a drawing and automatically, with the processing unit, assigning a unique identifier to each of the plurality of attributes. The method also includes automatically, with the processing unit, creating, a symbol representing the assigned unique identifier for each of the plurality of attributes and displaying the symbol for each of the plurality of attributes on the drawing.

Other aspects of the invention will become apparent by consideration of the detailed description and accompanying drawings.

BRIEF DESCRIPTION OF THE DRAWINGS

FIG. 8 illustrates a user interface generated by the system of FIG. 1 for prompting a user whether the user wants to select a view order for numbering.

FIG. 9 illustrates a user interface generated by the system of FIG. 1 for informing a user that a selected attribute has an assigned identifier.

FIG. 10 illustrates a user interface generated by the system of FIG. 1 for prompting a user to enter value for an identifier.

FIG. 11 illustrates a user interface generated by the system of FIG. 1 for informing a user that an entered identifier value already exists for a drawing.

FIG. 20 illustrates a user interface generated by the system of FIG. 1 for informing a user that a last number used was updated.

FIG. 21 illustrates a user interface generated by the system of FIG. 1 for prompting a user to specify a location for a dimension identifier table.

FIG. 22a illustrates tabular dimensions.

FIG. 22b illustrates identifiers for the tabular dimensions of FIG. 22a generated by the system of FIG. 1.

FIG. 24 illustrates a user interface generated by the system of FIG. 1 for prompting a user for general tolerances for dimension ranges.

FIG. 27 illustrates an output report generated by the system of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
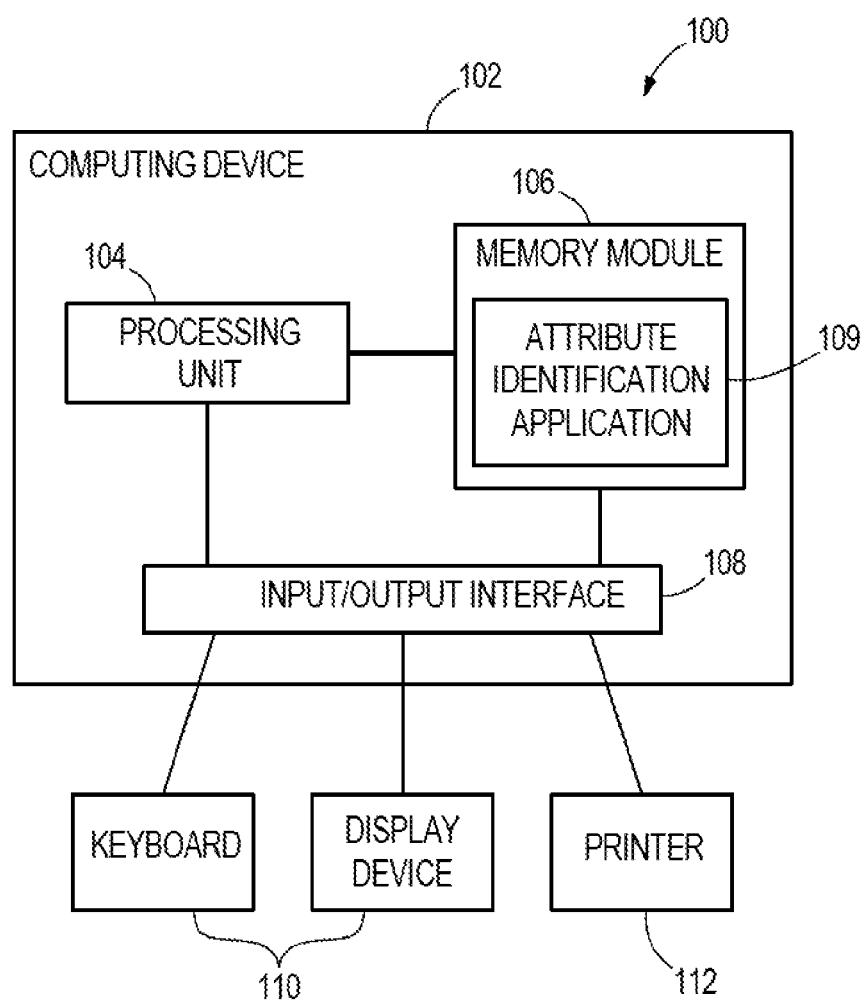
FIG. 1 schematically illustrates an automatic attribute identifier system.

FIG. 1 schematically illustrates an automatic attribute identifier system 100. The system 100 includes a computing device 102, which includes a processing unit (e.g., a microprocessor, application-specific integrated circuit ("ASIC"), etc.) 104, memory module 106 (e.g., RAM, ROM, and/or other non-transitory computer readable media), and an input/output interface 108. It should be understood that in other constructions the computing device 102 includes additional, fewer, or different components.

The computing device 102 can include a smart phone, a tablet computer, a laptop computer, a desktop computer, a smart television, a kiosk, a smart watch, or a similar device. The processing unit 104 is configured to retrieve instructions and data from the memory module 106, among other things, the instructions. In particular, the memory module 106 can store an attribute identification application 109. The processing unit 104 can execute the application 109 to perform automatic attribute detection and identification as described below. In some embodiments, the memory module 106 also stores a drawing editor application that, when executed by the processing unit 104, allows users to create, modify, and view drawings. It should be understood that in some embodiments, the attribute identification application 109 is combined with (e.g., a tool or add-in provided within) the drawing editor application.

The input/output interface 108 transmits data from the processing unit 104 to external systems, networks, and/or devices and receives data from external systems, networks, and/or devices. The input/output interface 108 can also store data received from external sources to the memory module 106 and/or provide the data to the processing unit 104. As illustrated in FIG. 1, the input/output interface 106 can communicate with one or more peripheral devices, such as one or more input devices 110 (e.g., a keyboard, a mouse, a touchscreen, a trackball, a joystick, etc.) and one or more output devices 112 (e.g., a display device, a printer, etc.). The input/output interface 108 can communicate with these peripheral devices using a wired or wireless connection. In some embodiments, the input/output interface 108 can also communicate with one or more networks. For example, the interface 108 can communicate with the Internet, a local area network, a wide area network, etc. to transmit and receive data (e.g., send and receive emails, access websites, etc.). Also, in some embodiments, the interface 108 communicates with at least one server over at least one network, wherein the server hosts the attribute identification application 109.

Figure 2:
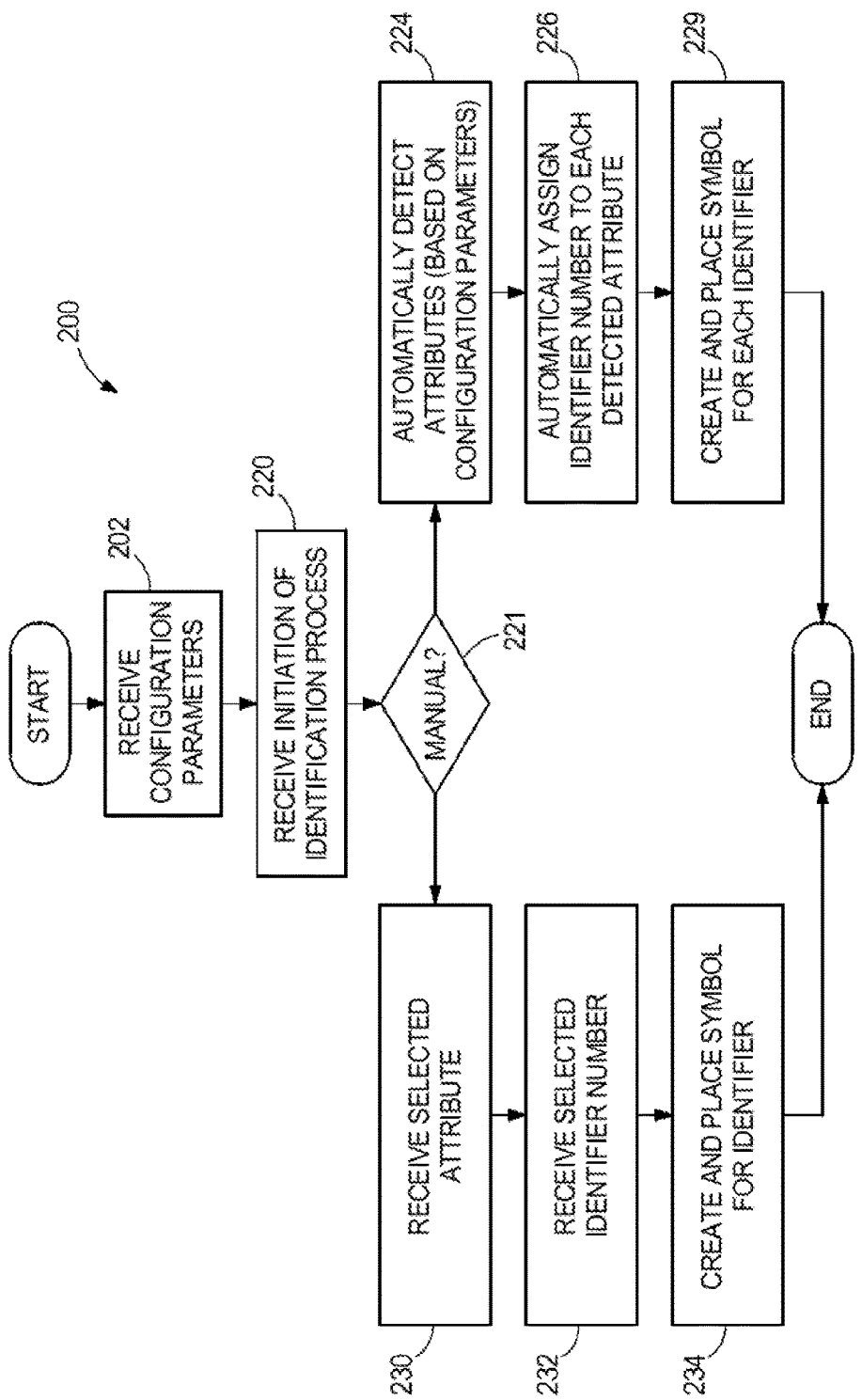
FIG. 2 is a flow chart illustrating a method of detecting and numbering drawing attributes performed by the system of FIG. 1.
Figure 3A:
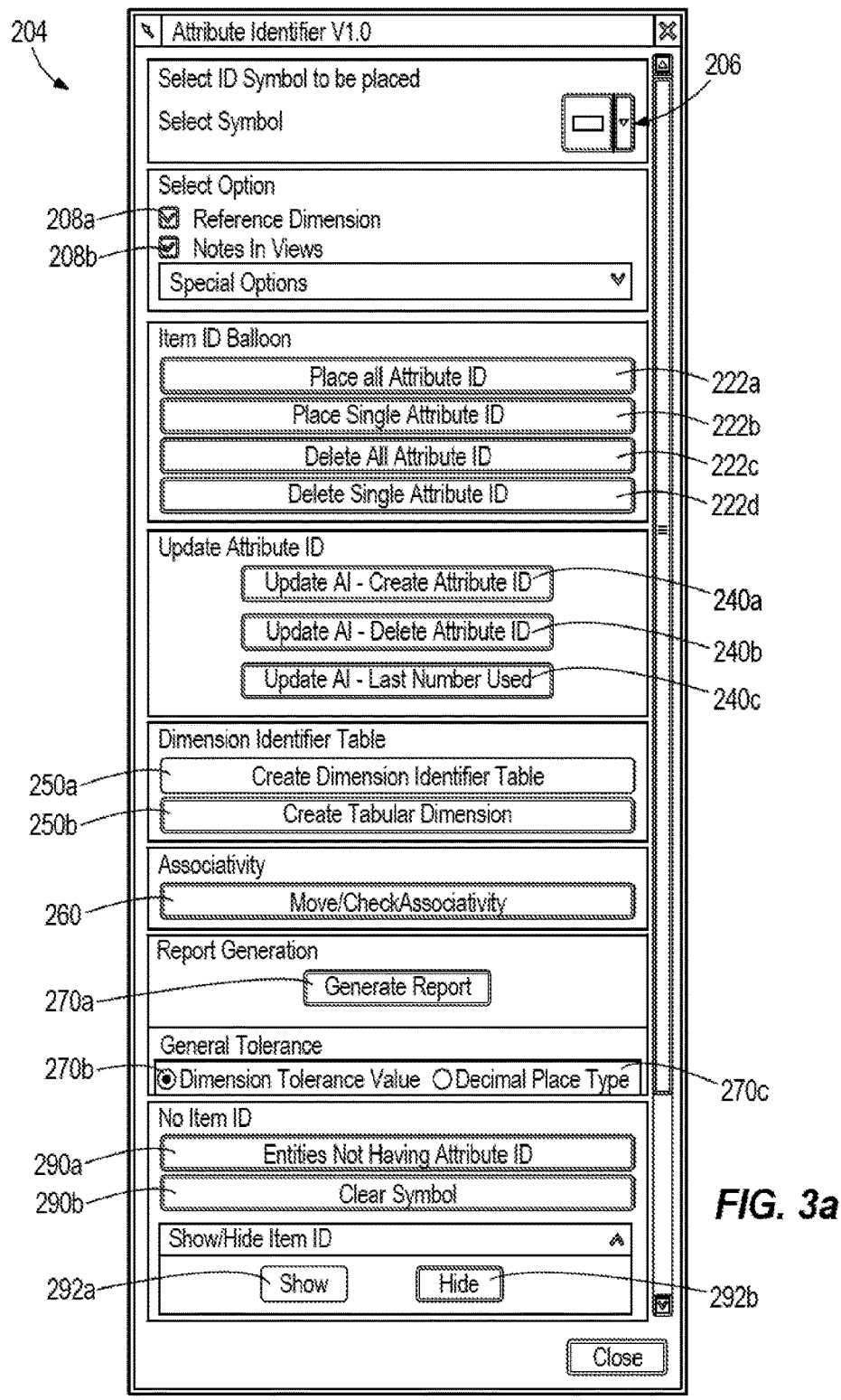
FIGS. 3a-d illustrate an identification menu generated by the system of FIG. 1.
Figure 3B:
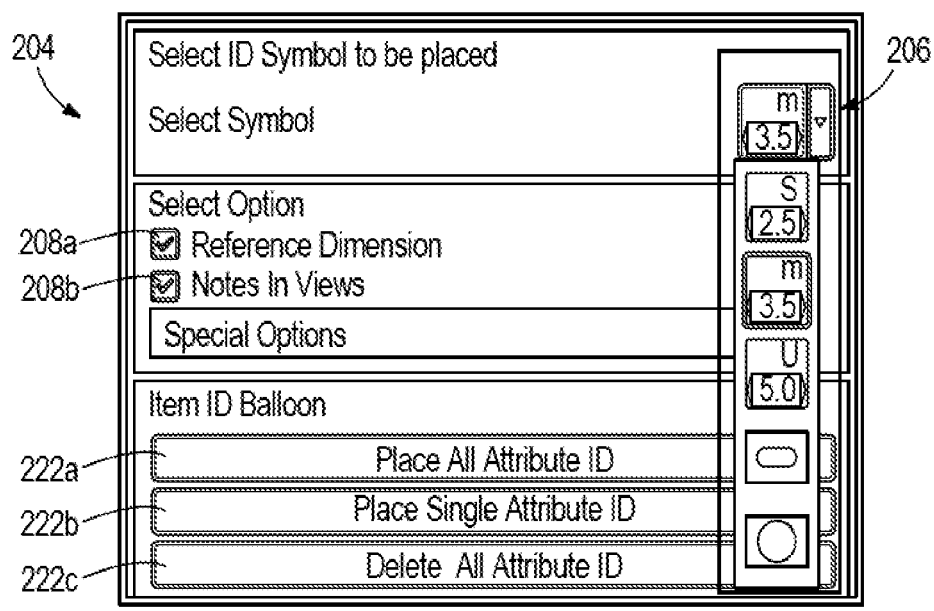

FIG. 2 is a flow chart illustrating a method 200 of performing automatic attribute identification using the system 100. The method 200 can be performed by the computing device 102 executing the attribute identification application 109. As illustrated in FIG. 2, the method 200 includes optionally receiving configuration parameters from a user (at block 202). To receive the configuration parameters, the application 109 can provide a user interface that presents various options and allows the user to set the parameters for the identification process. For example, FIG. 3a illustrates an identification menu 204. The menu 204 allows the user to set configuration parameters, such as the type of symbol the application 109 generates for each attribute identifier. In particular, the menu 204 can include a symbol selection mechanism 206. The symbol selection mechanism 206 can include a drop-down menu that display available symbol options (e.g., sizes, shapes, fonts, shading or coloring, etc.) to the user and allows the user to select one of the options (see FIG. 3b). The selected symbol can be displayed on a drawing associated with each identified attribute (e.g., as an "ID" balloon, bubble, icon, or object). In some embodiments, the available symbol options can include a default option and one or more custom options that can be customized by the user.

Figure 4:
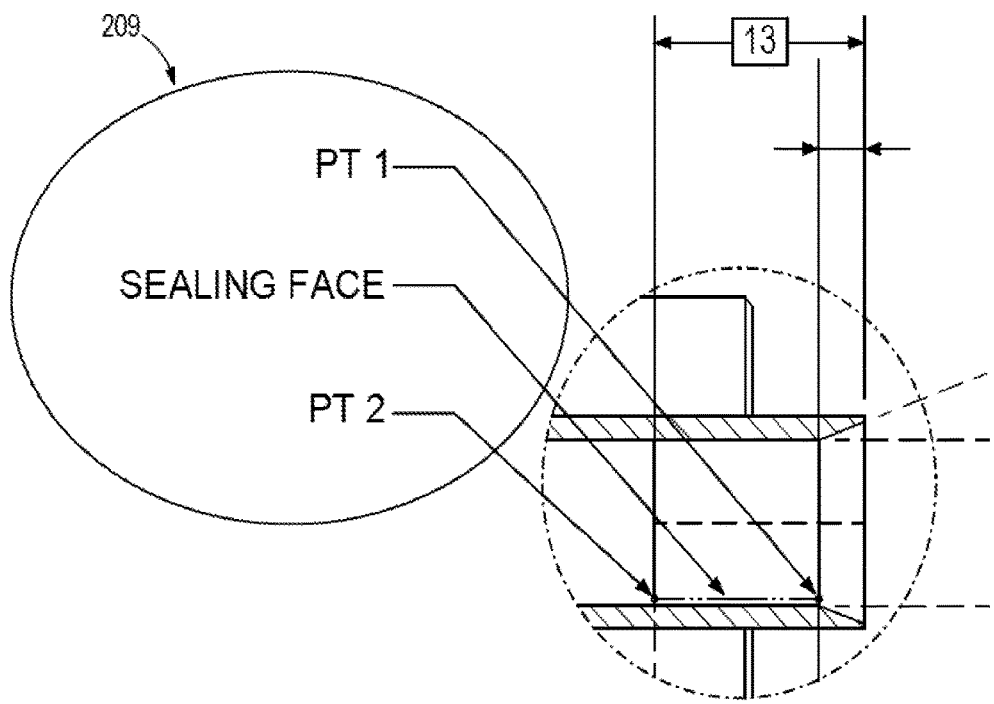
FIG. 4 illustrates notes in view included in a drawing view.

The menu 204 also allows a user to specify what type of attributes should be included in attribute identification process. For example, the menu 204 includes one more checkboxes that allow a user to select particular attributes (e.g., reference dimensions, notes in views, etc.) to include in the identification process. As illustrated in FIGS. 3a and b, the checkboxes can include a "Reference Dimension" checkbox 208a and a "Notes in Views" checkbox 208b. A user can select the "Reference Dimension" checkbox 208a to include reference dimension attributes in the identification process. A user can select the "Notes in Views" checkbox 208b to include notes in view in the identification process. "Notes in views" can include notes 209 attached to a view of a drawing using a lead line (see FIG. 4). A user can unselect either of the checkboxes 208a and 208b to exclude the reference dimensions or the notes from the identification process.

Figure 3C:
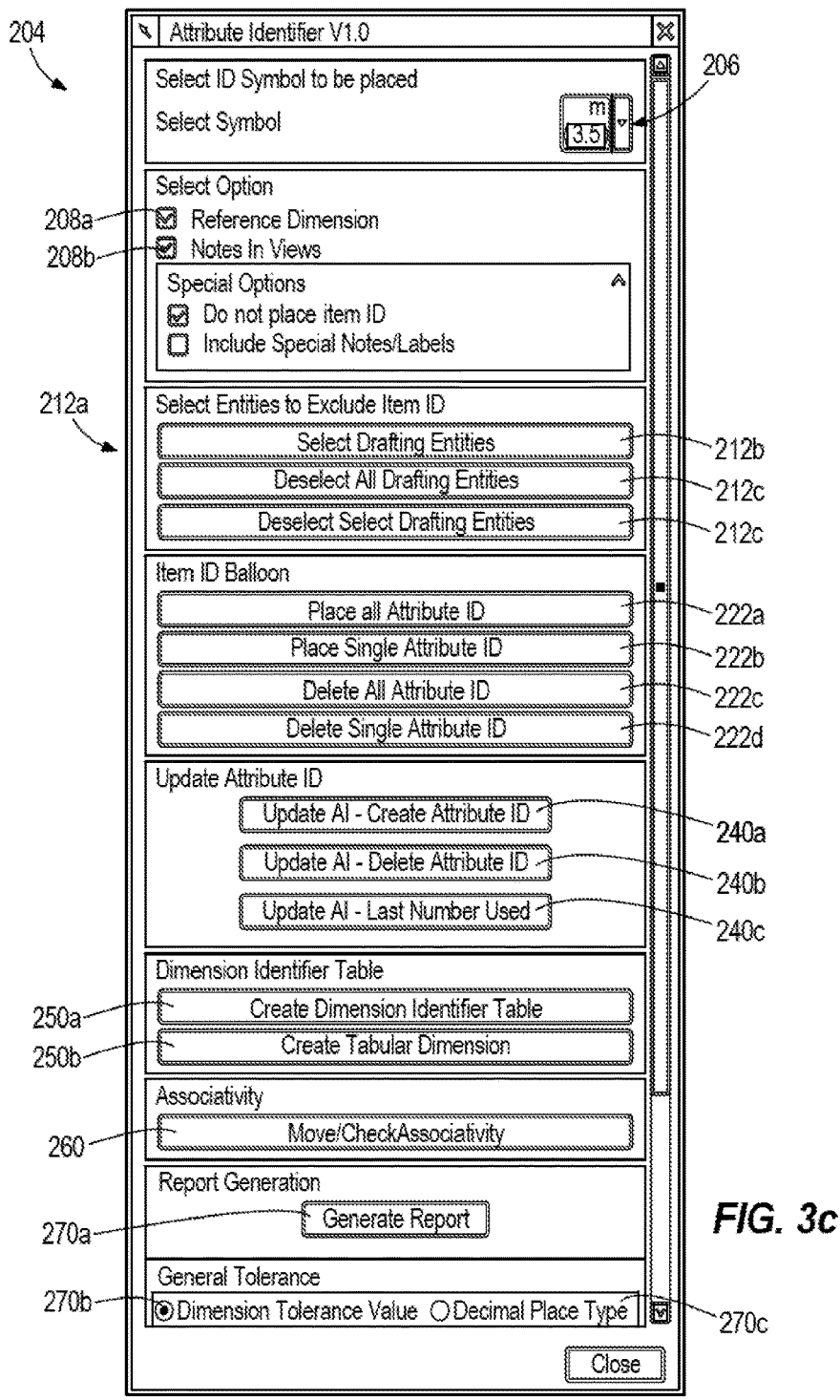
Figure 5:
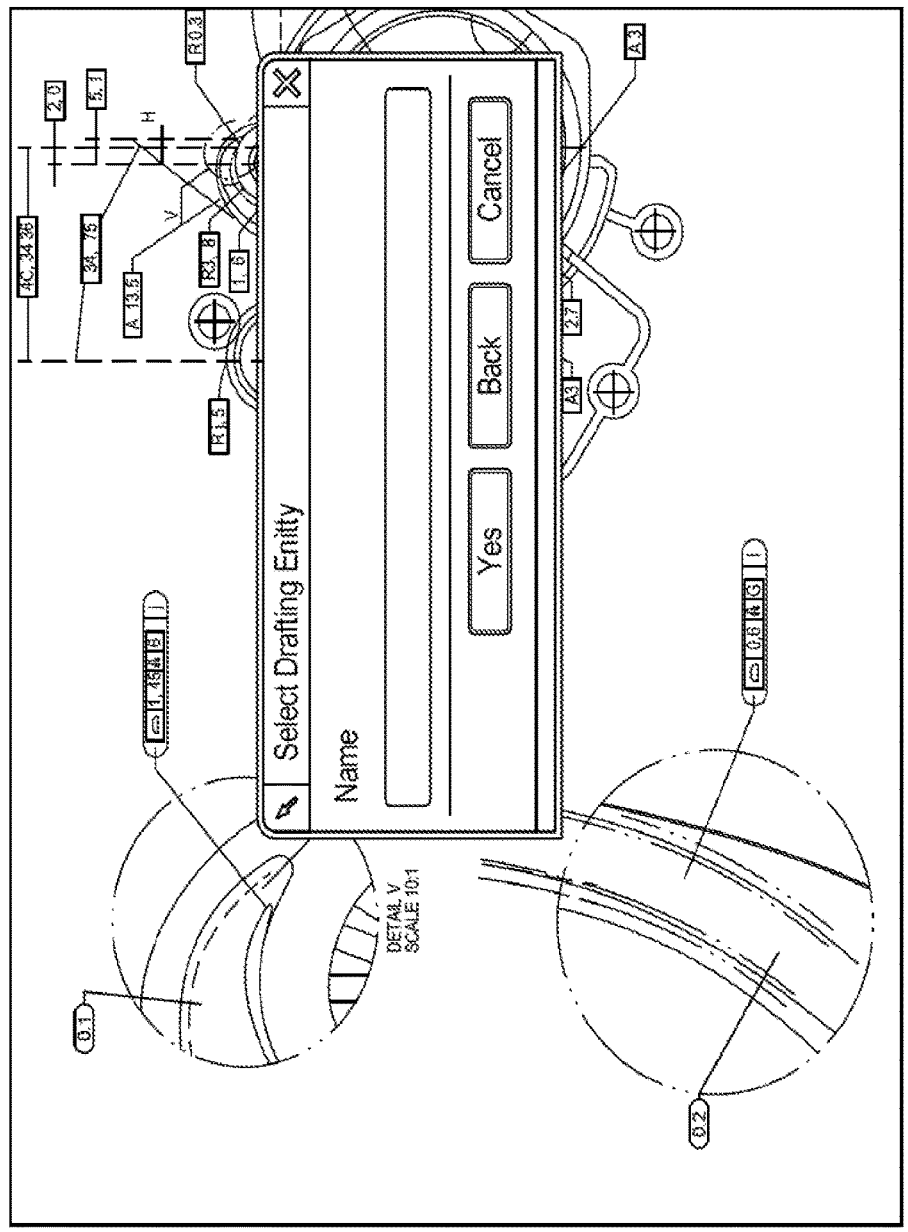
FIG. 5 illustrates a user interface generated by the system of FIG. 1 for prompting a user to select particular attributes to exclude an identification process.

The menu 204 also allows a user to specify what type of attributes should be excluded from the attribute identification process. For example, as illustrated in FIG. 3c, the menu 204 also includes a "Do not place item ID" checkbox 210a. If a user selects the "Do not place item ID" checkbox 210a, the application 109 displays an exclusion list 212a. The exclusion list 212a includes one or more buttons that the user can select to (i) select specific attributes to exclude. (ii) deselect all attributes that were previously-selected as attributes to exclude, or (iii) deselect particular attributes that were previously-selected as attributes to exclude. For example, if the user selects a "Select Drawing Entities" button 212b, the application 109 prompts the user to select particular attributes (e g dimensions, notes, GDT symbols, etc.) to exclude from identification process (see FIG. 5). In some embodiments, a user can select a particular attribute for exclusion by clicking on a particular attribute on a currently-displayed drawing. If the user selects a particular attribute from a drawing, the application 109 can be configured to exclude only the selected attribute from the process. Alternatively, the application 109 can be configured to exclude all attributes having the same type as the selected attribute from the process. Attributes marked for exclusion can be displayed differently on a drawing (e.g., highlighting, etc.).

Figure 6:
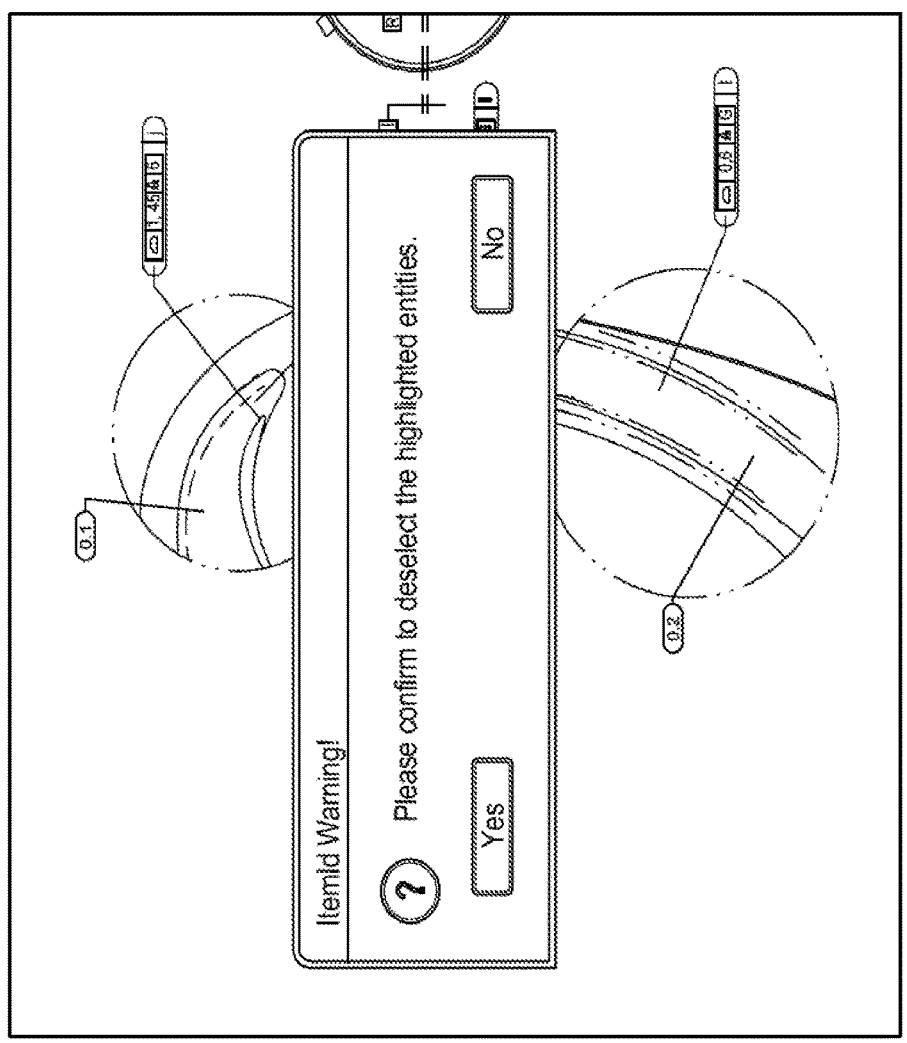
FIG. 6 illustrates a user interface generated by the system FIG. 1 for prompting a user to confirm de-selection of previously-selected attributes.
Figure 7:
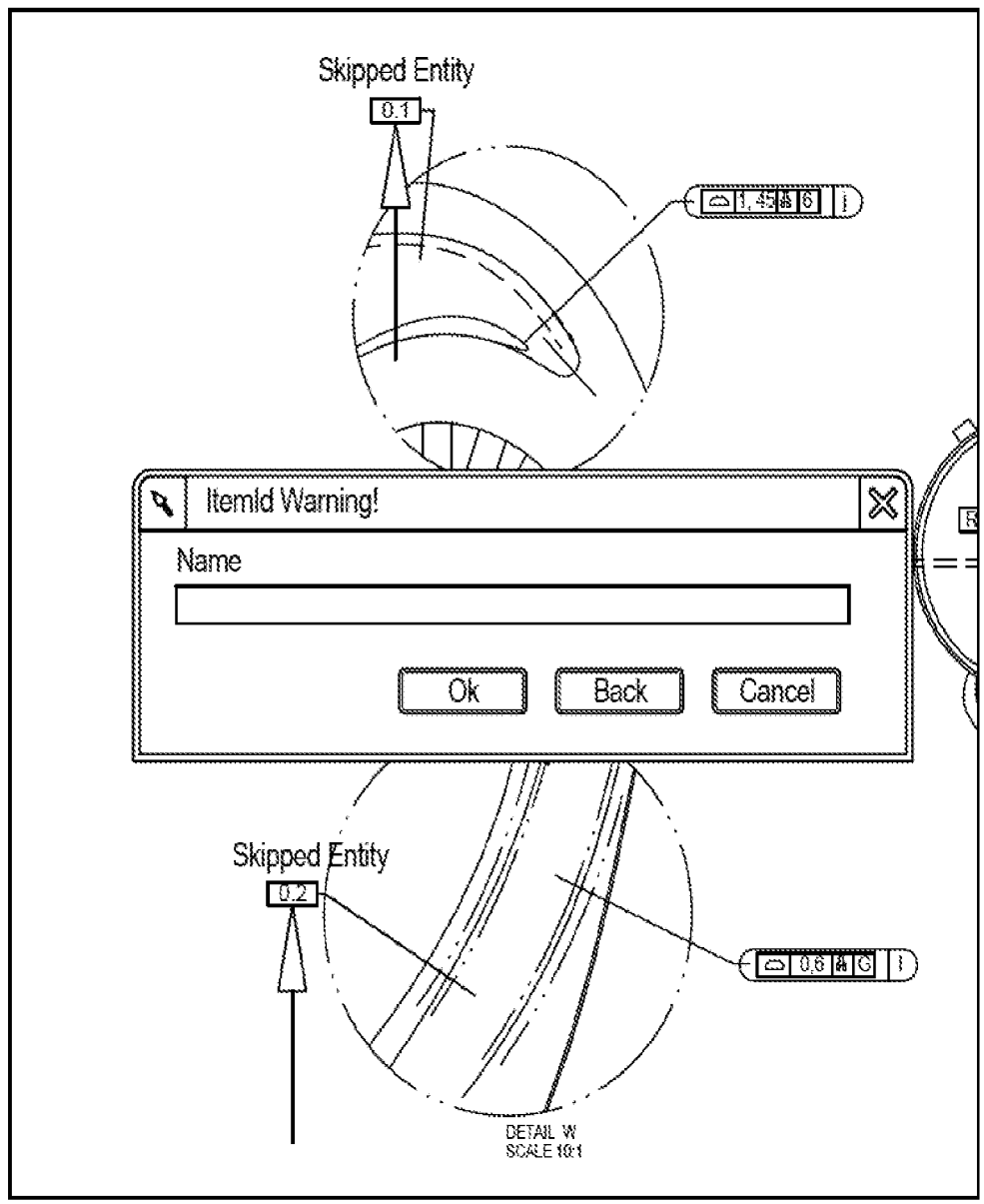
FIG. 7 illustrates a user interface generated by the system of FIG. 1 for prompting a user to select particular attributes for de-selection.

Similarly, if the user selects a "Deselect All Drawing Entities" button 212c, the application 109 de-selects all of the attributes or entries previously selected for exclusion (through the "Select Drawing Entities" button 212b). In some embodiments, the application 109 prompts the user to confirm the de-selection (see FIG. 6). Likewise, if the user selects a "Deselect Selected Drafting Entity" button 212d, the application 109 allows the user to manually identify which previously-selected attribute should no longer be excluded from the identification process (see FIG. 7).

Figure 3D:
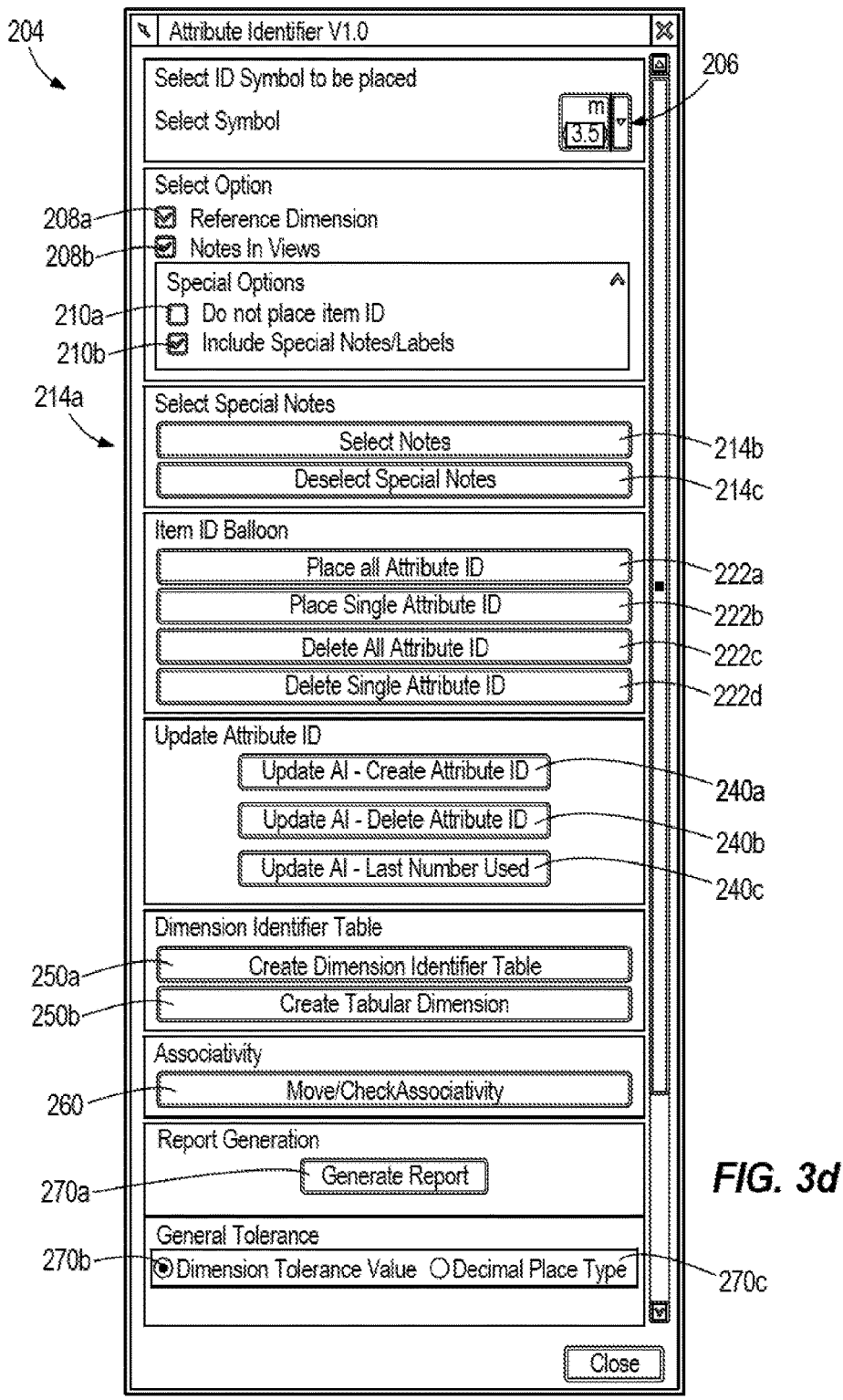

As illustrated in FIG. 3a, the special options selection mechanism 210 also includes an "Include Special Notes/Labels" checkbox 210b. The user can select the checkbox 210b to include particular special notes or labels in the identification process. For example, if the user indicates using the inclusion selection mechanism 208 that notes in view should not be included, the application 109 excludes all such notes from the identification process. However, the user can select the "Include special Notes/Labels" checkbox 210b to include specific notes or labels that otherwise would be excluded. In some embodiments, as illustrated in FIG. 3d, if the user selects the checkbox 210b, the application 102 displays an inclusion list 214a that includes one or more buttons for selecting and deselecting particular notes or labels. For example, the inclusion list 214a can include a "Select Notes" button 214b that the user can select to manually specify specific notes or labels for inclusion and a "Deselect Special Notes" button 214c that the user can select to de-select previously-selected notes or labels.

Returning to FIG. 2, after the user provides any desired configures the identification process, the user can initiate the identification process (at block 220). In some embodiments, a user can initiate a manual identification process or an automatic identification process (at block 221). For example, as illustrated in FIG. 3a, the menu 204 also includes one or more buttons that allow the user to initiate the identification process. The buttons can include a "Place All Attribute ID" button 222a, a "Place Single Attribute ID" button 222b, a "Delete All Attribute ID" button 222c, and a "Delete Single Attribute ID" button 222d. To perform an automatic identification process, a user can select the "Place All Attribute ID" button 222a. In some embodiments, when the user selects the "Place ALL Attribute ID" button 222a, the application 109 prompts the user whether the user wants to select a view order for the drawing file (see FIG. 8). If the user wants to select a view order for the drawing file (i.e., selects the "Yes" button in FIG. 8), the application 109 can display a selection menu that allows the user to select the views in an order. The application 109 applies numbering to detected attributes based on the selected view order. Alternatively, if the does not want select a numbering order for the views (i.e., selects the "No" button in FIG. 8), the application 109 performs numbering in a default order (e.g., select view from top most row of views and assign identifiers for all attribute entries in that view and then move to the next view and, ultimately, to the next row).

To perform the automatic identification process, the application 109 scans the drawing file (which may include one or more views) and detects each attribute (at block 224). In some embodiments, the attributes are created separate from the drawing itself. For example, a user can specify that he or she wants to add an attribute to the drawing file, and a separate object is created and associated with the drawing file. Accordingly, the application 109 can detect attributes by collecting the attribute objects for the drawing file. Alternatively, the application 109 can be configured to automatically identify drawing attributes by scanning the drawing file for particular text, objects, locations, formats, etc. that are associated with attributes dimension labels, table formats lead lines, etc.). The application 109 can also be configured to automatically identify a type of attribute associated with a detected attribute. In some embodiments, the attributes are classified by type (e.g., as dimensions, edge breaks, etc.) when the attributes are created (e.g., the user selects a type when adding a drawing attribute and a code or other identifier is stored with the created attribute). In other embodiments, the application 109 is configured to automatically identify each attribute type (e.g., based on the text included in the attribute or the attributes location or format, etc.).

Figure 17:
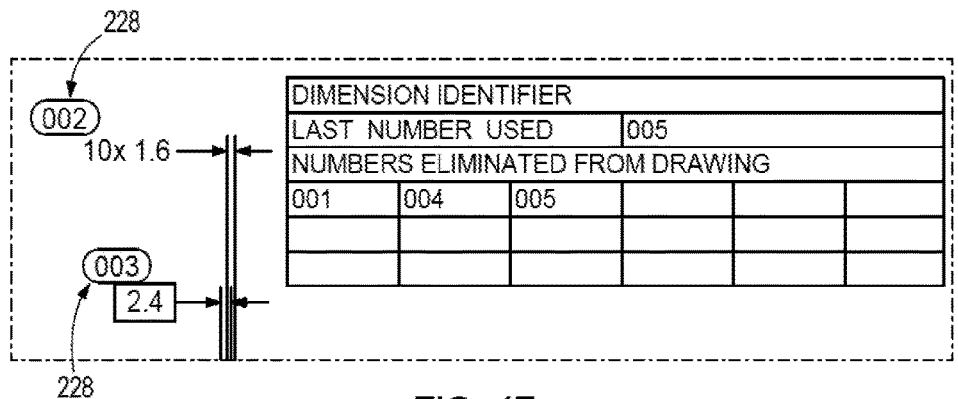
FIGS. 17-19 illustrate a dimension identifier table generated by the system of FIG. 1.

After detecting the attributes (at block 224), the application 109 automatically generates a unique number for each detected attribute (e.g., each dimensions, GDT symbols, notes in view, surface finish symbols, edge break symbols, general notes, etc.) (at block 226). The application 109 also places a symbol 228 for each identifier within the drawing file (at block 229) (see, e.g., FIG. 17). It should be understood that the identification process performed by application 109 is performed based on the configurations specified by the user (at block 202).

Alternatively, to initiate a manual identification process (at block 221), a user can select the "Place Single Attribute ID" button 222b. Selecting the "Place Single Attribute ID" button 222b allows the user to select a particular individual attribute needing identification (at block 230). If the user selects an attribute that already has a unique number associated with it, the application 109 can generate a message that informs that the user that the selected attribute already is assigned a unique identifier and the user should select a different attribute (see FIG. 9).

Figure 12:
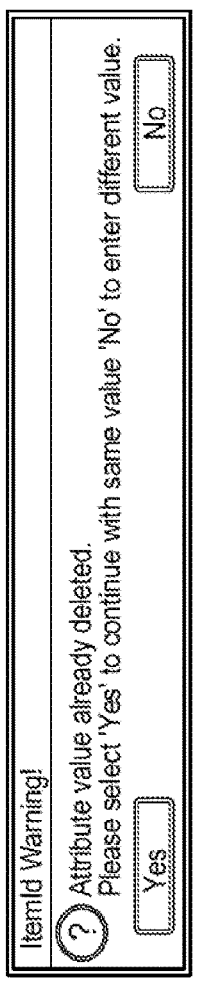
FIG. 12 illustrates a user interface generated by the system of FIG. 1 for information a user that an entered identifier value is associated with a deleted attribute.

If the user selects an attribute that does not already have a unique identifier, the application 109 prompts the user to manually specify a number for the selected attribute (at block 232) (see FIG. 10). In some embodiments, if the user enters a predetermined number (e.g., zero), the application 109 is configured to automatically assign the selected attribute (e.g., the next available number). Otherwise, if the user specifies a number that is already assigned to an attribute, the application 109 generates a message that informs the user of the duplication and instructs the user to enter a different value. It should be understood that when checking for duplicate numbers, the application 109 is configured to check any numbers assigned to current attributes and any minibus assigned to deleted attributes. If a user enters a value assigned to a deleted attribute, the application 109 can be configured to generate a message that informs the user of the duplication and allows the user to either enter a new number or continue with the entered number (see FIG. 12). If the user selects to continue with the entered number, the application 109 is configured to remove the attribute value from the deleted list and assign to the selected attribute. In some embodiments, if a user selects an attribute with multiple components (e.g., multiple GDT symbols, composite GDT symbols, GDT symbols attached with dimensions, etc.), the application 109 prompts the user for a number for each component. The application 109 uses the entered value (or a predetermined number) to create and place a symbol 228 for the user-selected attribute (at block 234). In some embodiments, the symbols 228 for identifiers that were manually-entered by a user are different from the symbols 228 for identifiers that were automatically assigned by the application 109.

Figure 13:
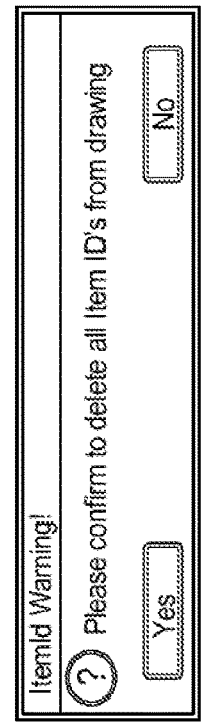
FIG. 13 illustrates a user interface generated by the system of FIG. 1 for prompting a user to confirm deletion of existing attribute identifiers.

After using the application 109 to uniquely identifier attributes, the application 109 can also allow a user to delete created identifiers. For example, as illustrated in FIG. 3a, a user can select the "Delete All Attribute ID" button 222c to delete the existing identifiers from the drawing file. The application 109 can be configured to prompt the user to confirm the deletion before deleting each identifier (see FIG. 13). In some embodiments, selecting the "Delete All Attribute ID" button 222c deletes all of the attributes previously-assigned through the application 109 and any other pieces of data generated by the application 109 (e.g., any symbols 228, any dimension identifier tables, etc.).

Figure 14:
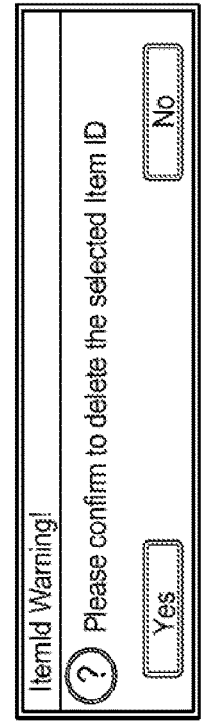
FIG. 14 illustrates a user interface generated by the system of FIG. 1 for prompting a user to confirm deletion of a selected attribute identifier.

If a user only wants to delete select attribute identifiers, the can user select the "Delete Single Attribute ID" button 222d and select a particular attribute identifier for deletion. The application 109 can be configured to prompt the user to confirm any deletion before deleting the identifier (see FIG. 14).

Figures 15, 16:
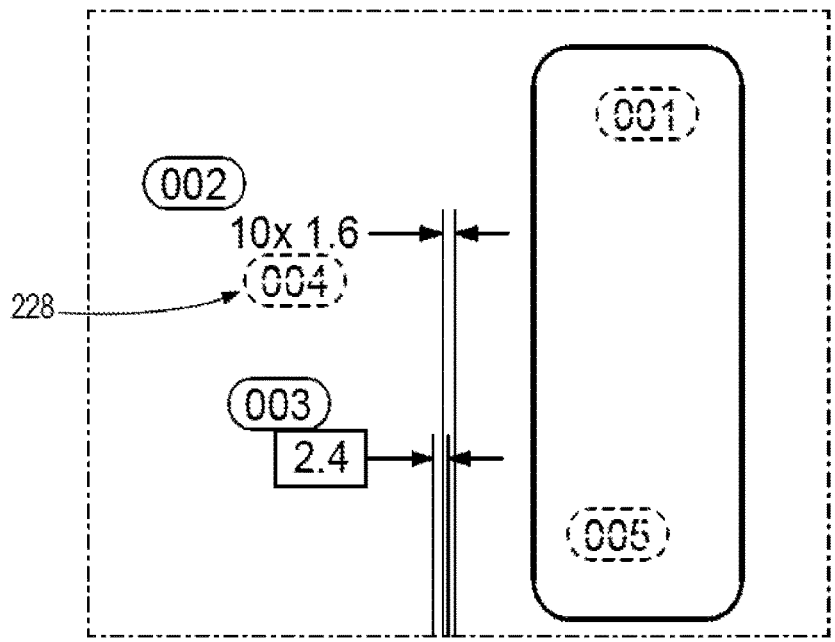
FIG. 15 illustrates a dimension identifier table generated by the system of FIG. 1.
FIG. 16 illustrates an attribute identifier associated with a deleted attribute.

As illustrated in FIG. 15, the application 109 can create a dimension identifier table 230. The dimension identifier 230 tracks the last number used by the application 109. The table 230 also tracks any identifiers deleted from a drawing. Therefore, when a user deletes one or more attribute identifiers, the application 109 automatically adds the deleted identifiers to the table 230. In some embodiments, the application 109 places the dimension identifier table 230 within the drawing. The table 230 provides a user with a quick reference to the state of the attribute numbering.

In addition to deleting existing identifiers, the application 109 can also be configured to allow a user to update an attribute identifier. For example, as illustrated in FIG. 3a, the menu 204 can include an "Update AI—Create Attribute ID" button 240a, an "Update AI—Delete Attribute ID" button 240b, and an "Update AI—Last Number Used" button 240c. A user can select the "Update AI—Create Attribute ID" button 240a to place an attribute identifier for a newly-added attribute entry without affecting the order of the old attribute identifiers. For example, if there are five newly-added drafting attributes in the drawing sheet, a user can select the "Update AI—Create Attribute ID" button 240a to have the application 109 automatically assign numbers for the five newly added attributes (e.g., rather than individually selecting each newly-added attribute and selecting the "Place Single Attribute ID" button 222b).

Also, in some embodiments, a user can delete a drawing attribute without deleting the associated attribute identifier. For example, as illustrated in FIG. 16, the symbol 228 associated with an identifier of a deleted attribute can be displayed differently than symbols 228 associated with existing attributes (e.g., greyed-out or shown with dashed lines). To delete these attribute identifiers that are not associated with a current drafting attribute, the user can select the "Update AI—Delete Attribute ID" button 240b. Any attribute identifiers deleted as a result of selecting this button 240b can be added to the dimension identifier table 230 (see FIG. 17).

As described above, a user can enter any value when manually placing an attribute identifier (e.g., using the "Place Single Attribute ID" button 222b) which can be used to set the "LAST NUMBER USED" in the dimension identifier table 230. Because this value is used by the application 109 when subsequently assigning attribute identifiers, a user may wish to change the value of the "LAST NUMBER USED" (e.g., if the user manually entered an incorrect or out of sequence number). Accordingly, a user can select the "Update AI—Last Number Used" button 240c to update the value of the "LAST NUMBER USED."

Figure 18:
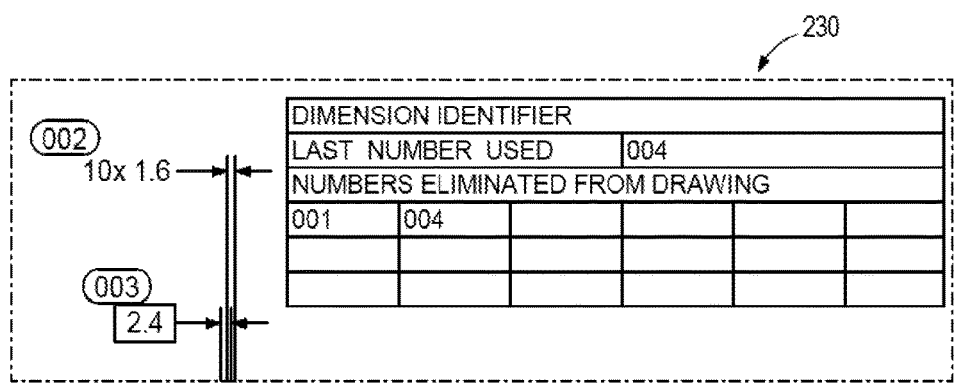
Figure 19:
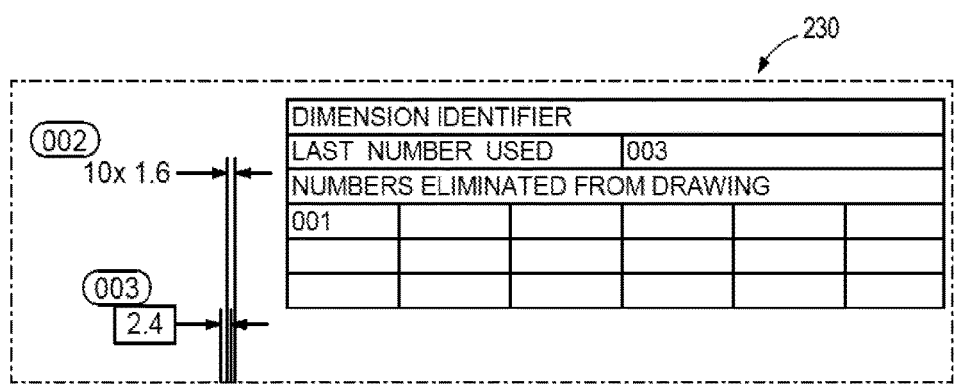

In some embodiments, clicking the "UPDATE AI—Last Number Used" button 240c, allows the user to manually change the value of the "LAST NUMBER USED." If the user-entered value for the "LAST NUMBER USED" is not already present in the dimension identifier table 230 or present in the drawing, the application 109 updates the value to the entered value. Alternatively, the application 109 can generate a message that informs the user that a different value, should be selected. In other embodiments, the user can delete the attribute identifier associated with the current value of the "LAST NUMBER USED" (e.g., as described above) and then click the "UPDATE AI—Last Number Used" button 240c to automatically update the value based on the deletion (i.e., set the value of the "LAST NUMBER USED" to the highest number assigned to an existing attribute). For example, FIG. 18 illustrates a dimension identifier table 230 before a user updates the "LAST NUMBER USED," and FIG. 19 illustrates the table 230 after performing the update and deleting the identifier previously associated with the "LAST NUMBER USED" (e.g., identifier "004"). In either situation, after the value of the "LAST NUMBER USED" is updated, the application can generate a message that informs the user that the value has been updated (see FIG. 20).

As noted above, the application 109 can create a dimension identifier table 230 (see FIG. 15). As illustrated in FIG. 15, the dimension identifier table 230 includes the value of the last assigned attribute identifier number (i.e., the value of the "LAST NUMBER USED") and includes a listing of attribute numbers that were assigned and subsequently deleted. In some embodiments, the application 109 is configured to automatically create a dimension identifier table 230 (e.g. after at least one attribute identifier is created by the application 109). Iii other embodiments, the application 109 creates a dimension identifier table 230 in response to a user request. For example, as illustrated in FIG. 3a, the menu 204 can include a "Create Dimension identifier Table" button 250a. A user can select the "Create Dimension Identifier Table" button 250a to request that the application 109 create a dimension identifier table 230. In some embodiments, the user can also specify where the table 230 should be placed on a drawing sheet (see FIG. 21). In other embodiments the application 109 can be configured to place a created dimension identifier table 230 at a predetermined, default position on the drawing. If a dimension identifier table 230 already exists, the application 109 can disable (e.g., grey-out) the "Create Dimension Identifier Table" button 250a (see FIG. 3a).

A user can also request that the application 109 create individual identifiers for dimensions shown in tabular format (i.e., "tabular dimensions") (e.g., see FIG. 22a). The application 109 can assign the identifiers based on the "LAST NUMBER USED." In some embodiments, as illustrated in FIG. 22b, the identifiers associated with tabular dimensions are illustrated differently than identifiers associated with other attributes. For example, the application 109 can display the identifiers for tabular dimensions in a table.

Figure 23:
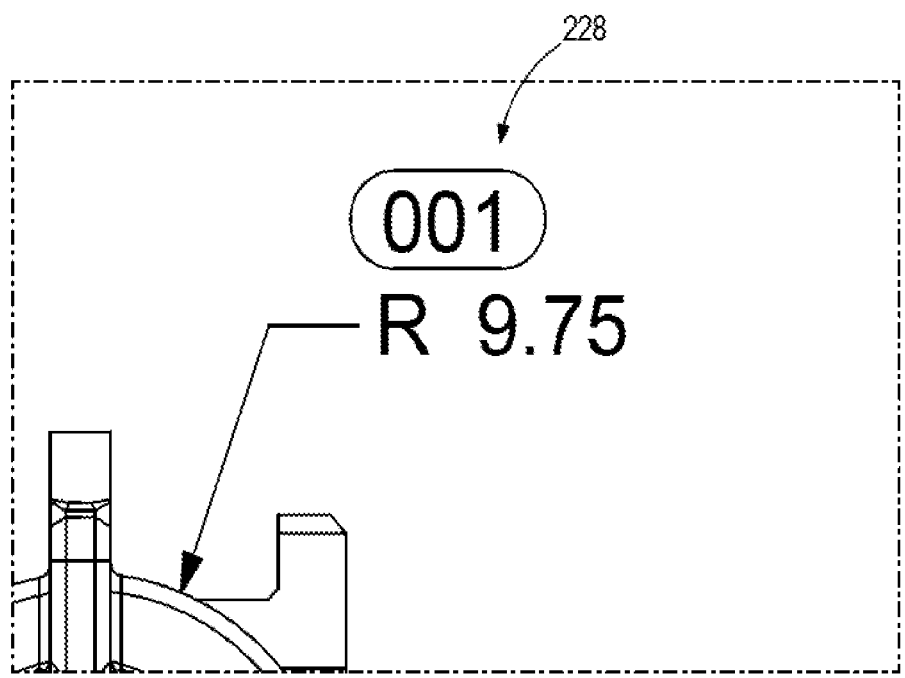
FIG. 23 illustrates an association between an attribute and an identifier symbol generated by the system of FIG. 1.

As symbols and tables are added to a drawing, the drawing may become cluttered where it is difficult for a user to identify what symbol 228 is associated with what attribute. Therefore, the application 109 can provide a "Move/Check Associativity" button 260 (see FIG. 3a). This button 260 allows a user to check the associativity of a selected symbol 228 to the corresponding drawing attribute. For example, when a user selects the button 260, the user can select a symbol, and the application 109 can identify the associated attribute (or vice versa). As illustrated in FIG. 23, a selected symbol 228 and the corresponding attribute can be identified using highlighting, flashing or other animation, matching colors, etc. In some embodiments, the user can also use "Move Check Associativity" button 260 to move a selected symbol 228 (e.g., by clicking and dragging a symbol 228 to a new location). Also in some embodiments, if a user moves a drawing attribute, the application 109 automatically moves the associated symbol 228.

Figure 24:
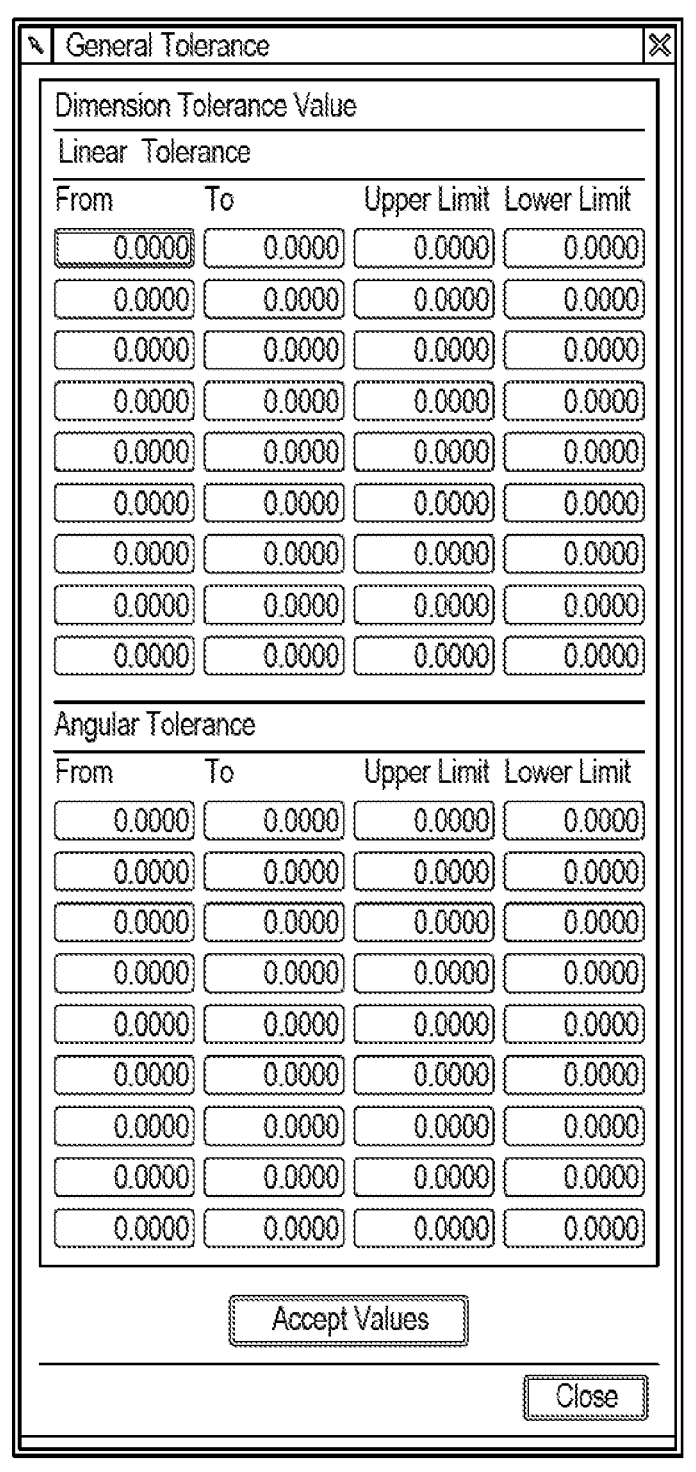
Figure 25:
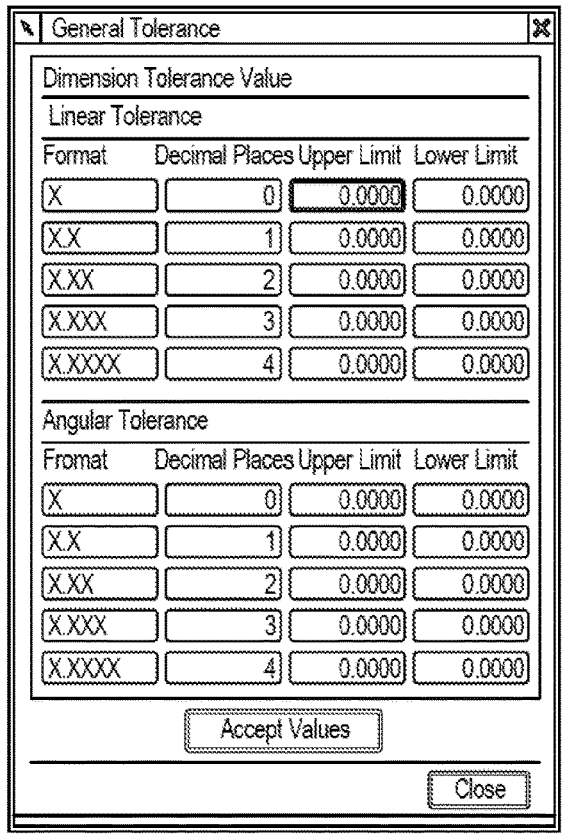
FIG. 25 illustrates a user interface generated by the system of FIG. 1 for prompting a user for tolerances for decimal formats.

The application 109 also generates an output report based on the assigned attribute identifiers. For example, as illustrated in FIG. 3a, the menu 204 includes a "Generate Report" button 27a. The menu 204 can also include one or more selection mechanisms for setting report parameters. For example, a user can set tolerances for dimensions that do not have assigned tolerances. In some embodiments, a user can assign a general tolerance value based on a dimension value (e.g., by selecting a "Dimension Tolerance Value" radio button 270b) or a decimal place tolerance (e.g., by selecting a "Decimal Place Type" radio button 270c). If a user selects the "Dimension Tolerance Value" radio button 270b and selects an "Assign General Tolerance" button 270d, the application 109 displays a tolerance table (see FIG. 24) that allows the user to specify linear and annular tolerances levels for user-selected ranges. Alternatively, if a user selects the "Decimal Place Type" radio button 270c and the "Assign General Tolerance" button 270d, the application 109 displays a decimal table (see FIG. 25) that allows the user to specify linear and annular tolerance levels for different decimal formats. In some embodiments, the user can either the "Dimension Tolerance Value" radio button 270b or the "Decimal Place Type" radio button 270c but cannot select both. If the user wants to delete any previously-assigned general tolerances, the user can select a "Reset General Tolerance" button 270e. In some embodiments, the general tolerance values are used for attributes contained in notes or any standards specified in a drawing.

Figure 26:
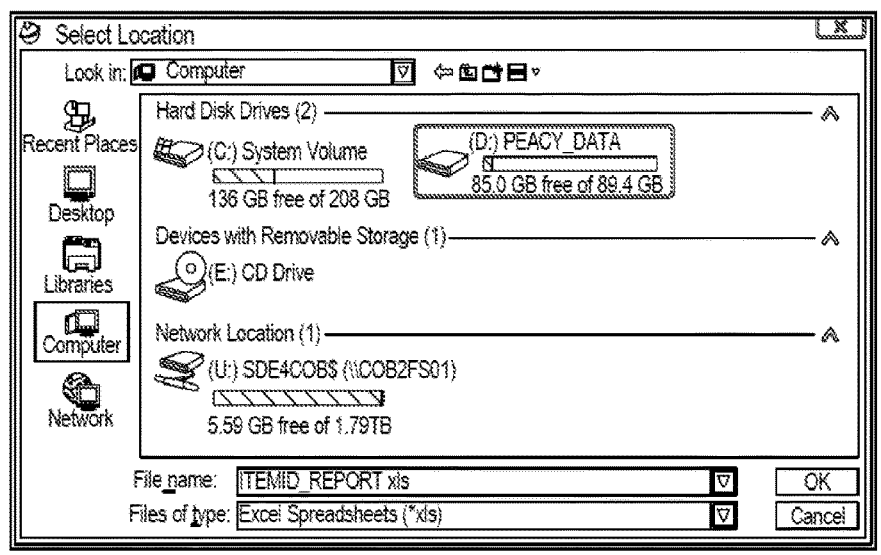
FIG. 26 illustrates a user interface generated by the system of FIG. 1 for prompting a user for a storage location for an output report.

After setting any desired general tolerances, the user can select the "Generate Report" button 270a. The application 109 can be configured to generate an output report in a word or spreadsheet format, which can be displayed to the user and/or exported and stored to a user-selected memory location. For example, after selecting the "Generate Report" button 270a, the application 109 can display a dialog box or window (see FIG. 26) that allows the user to select the storage location.

FIG. 27 includes a sample output report 280. The output report 280 includes a description of each attribute to which an attribute identifier was assigned (i.e., through the application 109—either manually or automatically). The output report 280 can also include the location (e.g., sheet name, zone, etc.), tolerance, dimension, etc. for each assigned identifier (i.e., each symbol). The output report 280 allows a user to perform a drawing quality check (e.g., a tolerance stack-up analysis) by comparing the dimensions and tolerances between multiple reports generated for multiple revisions of a drawing. In some embodiments, the application 109 is also configured to automatically compared output reports 280 generated for different versions of a drawing and identify any attribute changes.

Figure 28:
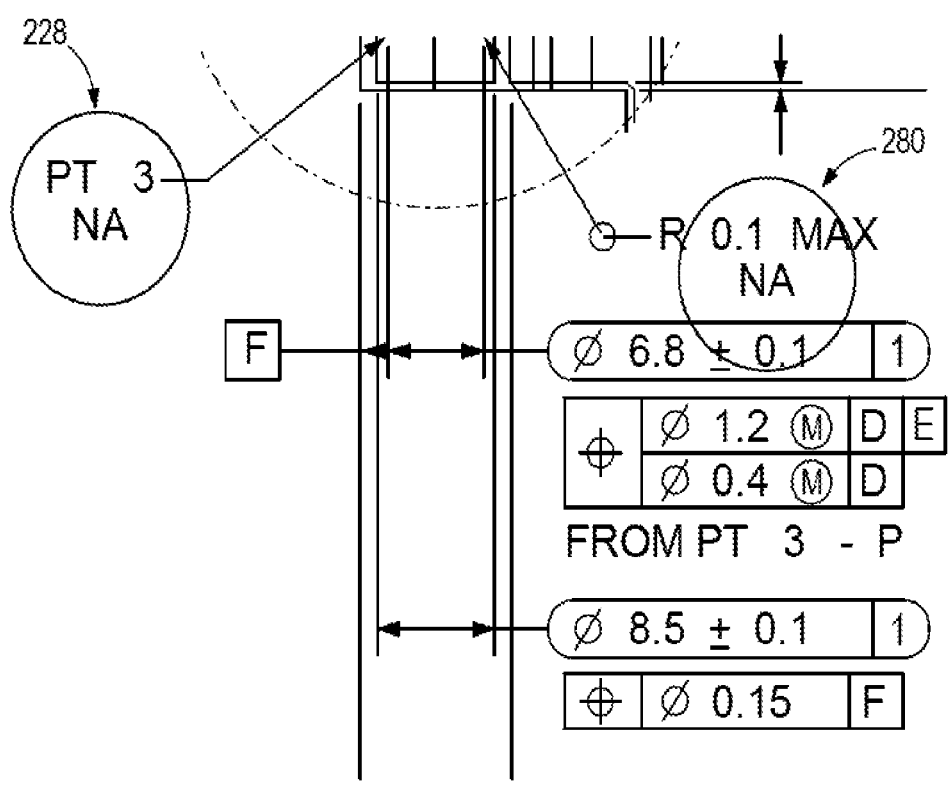
FIG. 28 illustrates a symbol generated by the system of FIG. 1 for attributes without an assigned identifier.

In some embodiments, the application 109 also identifies attributes not having an assigned identifier. For example, as illustrated in FIG. 3a, the menu 204 can include an "Entities not having Item ID" button 290a that the user can select. If a user selects this button 290a, the application 109 marks attributes that do not have an assigned identifier. The application 109 can mark the attributes by highlighting the attributes, flashing the attributes, assigning the attributes a particular color, and for placing a symbol (e.g., different from a symbol associated with an assigned identifier, such as a symbol containing the text "NA" rather than a numeric identifier—see, e.g., FIG. 28) by the attribute. Users can use this functionality to validate whether identifiers have been assigned for all attributes. A user can select a "Clear Symbol" button 290b to delete markings placed by the application 109 through activation of the "Entities not having Item ID" button 290a.

The application 109 can also allow user to hide attribute identifiers. For example, the menu 204 can include a "Show" button 292a and a "Hide" button 292b (see FIG. 3a). Selecting the "Hide" button 292b causes the application 109 to hide attribute identifiers in the drawing. Similarly, selecting the "Show" button 292a causes the application 109 to display any previously-hidden attribute identifiers. In some embodiments, if no attribute identifiers have been hidden, the "Show" button 292a can be disabled (e.g., greyed-out).

It should be understood that the user interfaces generated by the application 109 (e.g., the menu 204) can be provided as a single window or screen or can be provided as a series of windows or screens. Furthermore, the user interfaces can change dynamically based on user selections within the user interface. For example, as illustrated in FIGS. 3a-d, the menu 204 can dynamically change based on user selections within the menu 204.

Thus, embodiments of the invention provide methods and systems for performing automatic attribute identification (i.e., numbering) and provided analysis tools for drawing attributes. For example, the methods and systems can be used to compare dimensions and tolerances between different drawings and different revisions of the same drawings. The systems and methods can also be configured to generate reports that allow a user to performance a tolerance stack-up analysis.

Various features and advantages of the invention are set forth in the following claims.

What is claimed is:

1. A system for identifying attributes included in a drawing, the system comprising:
   a processing unit configured to:
   automatically identify a plurality of attributes associated with a drawing, wherein the plurality of attributes specify content within the drawing;
   automatically assign a unique identifier to each of the plurality of attributes;
   automatically create a symbol representing the assigned unique identifier for each of the plurality of attributes;
   display the symbol for each of the plurality of attributes on the drawing; and
   generate a report including the unique identifier assigned to each of the plurality of attributes.

2. The system of claim 1, wherein the processing unit is further configured to receive configuration parameters for identifying the plurality of attributes.

3. The system of claim 2, wherein the configuration parameters include a parameter to include an attribute type.

4. The system of claim 2, wherein the configuration parameters include a parameter to exclude an attribute type.

5. The system of claim 2, wherein the configuration parameters include a parameter to include a user-selected attribute.

6. The system of claim 2, wherein the configuration parameters include a parameter to exclude a user-selected attribute.

7. The system of claim 2, wherein the configuration parameters include a parameter to select the symbol.

8. The system of claim 1, wherein the processing unit is further configured to receive a user selection of an attribute and a user-entered unique identifier and automatically create a symbol representing the user-entered unique identifier for the user selection.

9. The system of claim 1, wherein the processing unit is further configured to receive a user selection of an attribute and automatically delete the unique identifier associated with the user selection.

10. The system of claim 1, wherein the processing unit is further configured to generate a table including a last used value for the unique identifier assigned to one of the plurality of attributes.

11. The system of claim 10, wherein the table further includes a listing of each unique identifier deleted from the drawing.

12. The system of claim 1, wherein the processing unit is further configured to mark one of the plurality of attributes associated with a symbol selected by a user.

13. The system of claim 1, wherein the processing unit is further configured to automatically identify at least one attribute associated with the drawing that is not assigned a unique identifier.

14. A method for identifying attributes included in a drawing, the method comprising:
   automatically, with a processing unit, identifying a plurality of attributes associated with a drawing, wherein the plurality of attributes specify content within the drawing;
   automatically, with the processing unit, assigning a unique identifier to each of the plurality of attributes;
   automatically, with the processing unit, creating a symbol representing the assigned unique identifier for each of the plurality of attributes;
   displaying the symbol for each of the plurality of attributes on the drawing; and
   generating a report including the unique identifier assigned to each of the plurality of attributes.

15. The method of claim 14, further comprising receiving a user selection of an attribute and a user-entered unique identifier and automatically creating a symbol representing the user-entered unique identifier for the user selection.

16. The method of claim 14, further comprising generating a table including a last used value for the unique identifier assigned to at least one of the plurality of attributes and displaying the table on the drawing.

17. The method of claim 14, further comprising generating a table including a listing of each unique identifier deleted from the drawing and displaying the table on the drawing.

18. The method of claim 14, further comprising automatically identifying at least one attribute associated with the drawing that is not assigned a unique identifier.

19. A method for identifying attributes included in a drawing, the method comprising:
   automatically, with a processing unit, identifying a plurality of attributes associated with a drawing, wherein the plurality of attributes specify content within the drawing;
   automatically, with the processing unit, assigning a unique identifier to each of the plurality of attributes;
   automatically, with the processing unit, creating a symbol representing the assigned unique identifier for each of the plurality of attributes;
   displaying the symbol for each of the plurality of attributes on the drawing; and
   generating a table and displaying the table, the table including at least one selected from a group consisting of a last used value for the unique identifier assigned to at least one of the plurality of attributes and a listing of each unique identifier deleted from the drawing.

20. The method of claim 19, further comprising generating a report including the unique identifier assigned to each of the plurality of attributes.

* * * * *